United States Patent
La Hue et al.

[15] 3,679,762
[45] July 25, 1972

[54] SELECTIVE HYDROGENATION OF ACETYLENES

[72] Inventors: Richard W. La Hue; Nolan A. Smith, both of Louisville, Ky.

[73] Assignee: Catalysts and Chemicals Inc., Louisville, Ky.

[22] Filed: June 8, 1970

[21] Appl. No.: 44,567

[52] U.S. Cl. .........................................260/677 H, 252/463
[51] Int. Cl. ............................................................C07c 5/08
[58] Field of Search ..............................................260/677 H

[56] References Cited

UNITED STATES PATENTS

| | | | |
|---|---|---|---|
| 3,075,917 | 1/1963 | Kronig et al. | 260/677 H |
| 3,155,739 | 11/1964 | Fleming | 260/677 H |
| 3,549,720 | 12/1970 | Wright et al. | 260/677 H |

Primary Examiner—Delbert E. Gantz
Assistant Examiner—Veronica O'Keefe
Attorney—Norman L. Wilson, Jr.

[57] ABSTRACT

In view of the exothermic nature of acetylene hydrogenation reactions it is necessary to effect the hydrogenation of process gas streams containing larger quantities of acetylenes under other than usually practiced conditions. Under such circumstances isothermal operation has become the process of choice. Whereas a multiplicity of palladium catalysts have found their place in adiabatic operation, very few of these perform satisfactorily in isothermal reactors. We have found a palladium catalyst which outperforms these known catalysts.

6 Claims, No Drawings

SELECTIVE HYDROGENATION OF ACETYLENES

BACKGROUND OF THE INVENTION

With the growth of the plastics industry olefins such as ethylene and propylene are produced in ever increasing quantities. In fact, ethylene is perhaps the largest volume petrochemical in terms of production. These olefins are obtained in petroleum refineries from refinery off-gases or other refinery products. Other quantities are produced by the thermal cracking or pyrolysis of hydrocarbons. Feeds vary from ethane up through naphtha and other oil field condensates.

It is known that olefins such as ethylene and propylene, as commercially produced, frequently contain minor amounts of acetylenes, for example acetylene and methylacetylene. Such commercially available olefins may not be suitable for some purposes, such as polymerization processes, unless the acetylenes are first removed.

The most practical method of removing these acetylenes is by selective hydrogenation. As pointed out in an article by Anderson et al. in I & E C, Nov. 1960, Vol. 52, No. 11, p. 901, in a full-scale plant with near-adiabatic reactors, a temperature rise of between 52° and 131° F. would occur in the bed for 1% $C_2H_2$ in an ethylene stream containing 3% $H_2$ at 392° F., depending on the extent to which the excess hydrogen reacts with the ethylene. Careful temperature control is thus required in catalytically processing ethylene streams to prevent excessive hydrogenation of ethylene. Hydrogenation of acetylenic compounds is highly exothermic. The heats of hydrogenation of acetylene compounds are much higher than of olefins, the delta H for ethylene being around −60,000 BTU/pound mol, whereas for acetylenes the delta H is around −137,000 BTU/pound mol.

In view of the exothermic nature of the acetylene selective hydrogenation process it is desirable to treat feed or process gas streams which contain larger quantities of acetylene, say one-half to five mol percent, acetylene in a somewhat different manner. In other words there is a limit to the concentration of impurity that can be economically processed. This is due to the fact that removal of the impurity is an exothermic reaction resulting in a temperature rise across the catalyst bed. With high impurity concentrations, the temperature reaches a level where the catalyst is non-selective and loss of product occurs. Under such conditions one of several methods are generally employed. The product stream can be recycled. However it appears that recycling causes rapid fouling of the catalyst, resulting in short operating cycles. Part of the polymer, or green oil, in the recycle stream also tends to deposit on the catalyst surface, thus increasing the fouling rate. Another alternative is to use separate reactors and partially hydrogenate the acetylene in each one. For this process to be effective the stream must be cooled before injection into a subsequent reactor.

The importance of isothermal operation will be appreciated when the heat of reaction that is, the temperature rise or delta T, found in adiabatic operation, is compared with the delta T obtained under isothermal conditions sufficient to control the heat of reaction. Under isothermal conditions 60 to 75 percent of the heat of reaction is removed by heat transfer. Consider a process gas stream containing 2 mol percent acetylene to be hydrogenated in an adiabatic reactor to form ethane. If the inlet or initial reaction temperature is 130° F., the delta T will be 232° F. (274,000 BTU per pound mol of acetylene in the feed stream). A 90° F. temperature rise will result if the conversion is carried out isothermally. It can be seen therefore that certain quantities of acetylene, say over one-half volume percent, and especially 1 to 3 percent, require isothermal conditions of operation. In fact an adiabatic reactor will not operate if the feed gas stream contains more than 2 mol percent acetylene because of the tremendous temperature rise. Isothermal acetylene hydrogenation generally involves the use of a tubular reactor with the catalyst loaded into tubes which are surrounded with a liquid coolant such as propylene or butylene. The tubes must be completely surrounded with the hydrocarbon or other coolant, since any unsubmerged portion would react adiabatically. Coolant circulation on the shell side must be rapid enough to remove sufficient heat to control the exotherm and thus maintain a desired temperature rise or delta T during the reaction. It is to be understood, of course, that theoretically complete isothermal conditions are impossible to achieve. However, the processes nevertheless are referred to as isothermal processes. Isothermal operation for hydrogenating acetylene gas streams is more complex than adiabatic operation, which is employed when small quantities of acetylene are present, i.e., less than 1 percent. Isothermal operation is nevertheless the process of choice if more than trace quantities of acetylene are present in the olefin gas stream.

SUMMARY OF THE INVENTION

Many catalysts have been used for the selective hydrogenation of acetylene in an olefin stream. However, most of the activity is now centered around the use of palladium. Palladium catalysts are very effective selective hydrogenation catalysts. Such being the case, palladium catalysts are described as hydrogenation catalysts throughout the prior art, for example in U.S. Pat. Nos. 2,802,889, 2,946,829, 3,075,917, 3,113,980, and 3,116,342.

It is interesting to note that whereas the multiplicity of palladium catalysts have found their place in adiabatic operation, very few of these catalysts perform satisfactorily in isothermal reactors. In accordance with this invention we have discovered, quite unexpectedly, that one catalyst outperforms all others in isothermal operation. The catalyst is a palladium activated, predominantly alumina, hydrogenation catalyst of improved selectivity having between 0.01 and 5 percent by weight palladium on a dry basis uniformly distributed throughout a support containing at least 70 percent alumina, any remainder being clay, the support having a surface area of 80 to 300 square meters per gram, with at least 50 percent of its pores having average pore diameters in the size range below 800 Angstrom units.

DETAILED DESCRIPTION OF THE INVENTION

Olefins produced by cracking processes invariably are contaminated with appreciable quantities of acetylenes. When acetylene quantities are above normal, that is, above 1 volume percent, the temperature rise becomes more critical during hydrogenation. Careful temperature control is necessary during hydrogenation to minimize the polymer formation by keeping the temperature rise as low as possible, since it is known that polymer formation increases with increasing temperature. Careful temperature control is also required to keep the temperatures below that wherein significant quantities of ethylene are hydrogenated. Another factor to be considered when the amount of acetylene is above one volume percent during hydrogenation is that the polymer formation rate is roughly proportional to the acetylene concentration. This means also that the catalyst is adversely affected since, largely due to polymer or green oil formation, the life of the catalyst is inversely related to acetylene content. The importance of isothermal operation is thus quite apparent. Unfortunately many acetylene hydrogenation catalysts do not perform as well under isothermal conditions as they do in adiabatic reactors. The temperature range is more narrow, and there is a risk of a temperature runaway resulting from only a small change in operating conditions. In addition polymer formation appears to increase in isothermal reactors.

In considering the effects of isothermal operation catalysts for the hydrogenation of acetylenic compounds, it must be understood that many hydrogenation catalysts are eliminated ab initio since there are only a limited number of catalysts effective in hydrogenating acetylene in admixture with ethylene and to the exclusion of ethylene hydrogenation. For the most part these are palladium catalysts such as are disclosed in U.S. Pat. Nos. 2,802,889, 2,946,829, and 3,113,980. These depend for their success on specific catalytic compositions such as inactive carriers, distinct pore volumes, mean pore radii and the like. This invention is based on the discovery that in isothermal operation one catalyst outperforms the other acetylene selective hydrogenation catalysts. The catalyst found to be outstanding in isothermal operations is the subject of U.S. Pat. No. 3,549,720 and is incorporated herein by reference. This catalyst also contains palladium in the range of 0.01 to 5 percent by weight of the total catalysts, preferably 0.02 to 0.5. However, the physical properties of the catalysts of this invention represent departure from those of U.S. Pat. No. 3,113,980. The catalysts of this invention are characterized by three desiderata:

The palladium must be uniformly distributed throughout the catalyst support. It cannot be only on or near the surface thereof;

The major quantity of the pores must have diameters smaller than 800 Angstrom units (A). Preferably more than 50 percent of the pores have diameters smaller than 350A, say 29 to 350 Angstroms;

The alumina must have a surface area above 80 square meters per gram, preferably above 100.

Aluminas having these physical surface area and pore properties are available, an such aluminas can be made by the process described in U.S. Pat. No. 2,894,898 and in U.S. Pat. No. 3,539,468 filed Oct. 25, 1968. However, our preferred alumina is a commercially available active alumina obtained from pure alumina hydrate. This alumina comes in the shape of hard balls made by carefully controlled calcination of beta trihydrate. The alumina has a surface area of about 300 square meters per gram, a pore volume of 0.51 cc. per gram, and average pore diameters of 50 Angstroms. This alumina has very few pores larger than 800 Angstrom units in diameters. Calcination redistributes the pore size so that the majority of pores are in the range below 350 Angstrom units in diameter.

As indicated hereinbefore the palladium promoter cannot be on the carrier surface only. It must be uniformly distributed throughout the alumina support. There are two ways of insuring that the palladium promoter is uniformly distributed throughout the alumina supports. One method is by mixing or milling a palladium compound into the composition before forming into catalyst particles. However, the preferred method of making certain that the palladium is uniformly distributed involves the selection of the noble metal salt. It has been found, for example, that if $PdCl_2$ is employed, palladium will not be distributed throughout the alumina. If alumina pellets are dipped in a solution of $Pdcl_2$, the palladium will remain on or near the surface of the alumina carrier. However, if alumina pellets or tablets are dipped in an aqueous solution of $Pd(NH_3)_2Cl_2$, the palladium penetrates the carrier and will be uniformly distributed throughout the tablets after drying.

In order to illustrate the preparation of the catalyst in accordance with this invention the following example is given.

EXAMPLE 1

Alumina prepared according to Example 1 of U.S. Pat. No. 3,539,468 was formed into 4 × 8 mesh spheres. Following U.S. Pat. 3,549,720 the resulting particles were then calcined at 1,950° F. yielding catalysts having the surface area and pore properties listed hereinafter. The particles were then dipped in sufficient aqueous solution of $Pd(NH_3)_2Cl_2$ to cover and impregnate them with 0.035 weight percent palladium based on the weight of the catalyst. After being drained and dried at 250° F., the particles were calcined at 700° F. This catalyst had the following properties:

Physical Properties

| | |
|---|---|
| Palladium (%) | 0.035 |
| Surface Area (m²/gm) | 122 |
| Pore Volume (cc/gm) | 0.64 |
| Pore Volume Distribution | |
| (Percent based on pore diameter size) | |
| >800 Angstroms | 31 |
| 800 – 350 Angstroms | 11 |
| <350 Angstroms | 58 |
| Average Pore Diameter (Angstroms) | 210 |

The outstanding efficiency of these catalysts, tested under isothermal conditions considered severe due to the presence of greater than 1 mol percent acetylene in the gas stream, is shown by the following data. The isothermal reactor was operated at a space velocity of 5,000 V/V/hr; a pressure of 175 psig; and a temperature of 130° F. The process gas consisted of a mixture of 2 mol percent acetylene; 4 mol percent hydrogen; 35 mol percent ethylene; and 59 mol percent nitrogen. Percent conversions were determined from the percent acetylene in the inlet stream and the percent acetylene in the outlet stream. The activity retention, i.e., percent retention of activity, was determined by dividing the percent conversion after 100 hours on stream by the initial conversion. In addition the polymer formed was quantitatively determined by collecting and measuring the liquid polymer formed during 100 hours on stream. In the appearance of the catalyst, "fouled" means the accumulation of polymer and/or carbon on the dropped catalysts. The activity and polymer data resulting from the use of this catalyst were as follows:

Activity

| | Average of Two Runs |
|---|---|
| Initial conversion (%) | 81.0 |
| Activity Retention (%) | 60.7 |
| Polymer Formed (gm/hr × 10²) | 4.39 |
| Catalyst Appearance | Slightly Fouled |

EXAMPLE 2

Results obtained using a catalyst prepared as ¼ × ⅛ inch tablets in accordance with Example 1 were as follows. Reaction and test conditions were the same as those given in Example 1.

Physical Properties

| | |
|---|---|
| Palladium (%) | 0.035 |
| Surface Area (m²/gm) | 86 |
| Pore Volume (cc/gm) | 0.62 |
| Pore Volume Distribution | |
| (Percent based on pore diameter size) | |
| >800 Angstroms | 12 |
| 800 – 350 Angstroms | 14 |
| <350 Angstroms | 74 |
| Average Pore Diameter (Angstroms) | 292 |

Activity

| | Average of Three Runs |
|---|---|
| Initial Conversion (%) | 79.0 |
| Activity Retention (%) | 51.0 |
| Polymer Formed (gm/hr × 10²) | 3.22 |
| Catalyst Appearance | Slightly Fouled |

EXAMPLE 3

Results obtained using another catalyst prepared as 6 × 8 mesh spheres in accordance with Example 1 were as follows. Reaction and test conditions were the same as those given in Example 1.

Physical Properties

| | |
|---|---|
| Palladium (%) | 0.035 |
| Surface Area (m²/gm) | 103 |
| Pore Volume (cc/gm) | 0.68 |
| Pore Volume Distribution | |
| (Percent based on pore diameter size) | |
| >800 Angstroms | 20 |
| 800 – 350 Angstroms | 14 |
| <350 Angstroms | 66 |
| Average Pore Diameter (Angstroms) | 265 |

Activity

| | Average of Five Runs |
|---|---|
| Initial Conversion (%) | 82 |
| Activity Retention (%) | 68 |
| Polymer Formed (gm/hr × 10$^2$) | 3.50 |
| Catalyst Appearance | Slightly Fouled |

To illustrate another method of preparing catalysts employed herein the following is given:

EXAMPLE 4

Alumina trihydrate and sufficient palladium nitrate so that the finished catalyst contains 0.035 weight percent palladium were dry mixed, and then sufficient water was incorporated in the mix to yield an extrudable mass. The mass was extruded in one-eighth inch particles or extrusions. The following are catalyst properties, and also test results obtained when this catalyst was used in the process described in Example 1.

Physical Properties

| | |
|---|---|
| Palladium (%) | 0.035 |
| Surface Area (m$^2$/gm) | 280 |
| Pore Volume (cc/gm) | 0.80 |
| Pore Volume Distribution | |
| (Percent based on pore diameter size) | |
| >800 Angstroms | 2 |
| 800 – 350 Angstroms | 3 |
| <350 Angstroms | 95 |
| Average Pore Diameter (Angstroms) | 114 |

Activity

| | |
|---|---|
| Initial Conversion (%) | 87 |
| Activity Retention (%) | 63 |
| Polymer Formed (gm/hr × 10$^2$) | 2.56 |
| Catalyst Appearance | Slightly Fouled |

To further illustrate the invention, results obtained using different catalysts of the invention are given. These additional catalysts are other preparations made by Examples 1 and 3. In two of the catalysts, however, less palladium salt was employed, sufficient so that the finished catalyst contained only 0.020 weight percent palladium.

TABLE 1

| Catalyst | Initial Conversion (Percent) | Activity Retention (Percent) | Polymer Formed (gm/hr × 10$^2$) |
|---|---|---|---|
| Ex.1 using 0.035 Pd | 86 | 62 | 4.39 |
| Ex.1 using 0.020 Pd | 87 | 51 | 2.93 |
| Ex.3 using 0.035 Pd | 75 | 72 | 3.50 |
| Ex.3 using 0.020 Pd | 65 | 62 | 2.20 |

Referring to the foregoing examples, it is to be noted that initial conversions are high and polymer formation is low. However, of particular significance is the face that more than 50 percent of the activity remains (activity retention) after 100 hours. This generally is not the case with other acetylene hydrogenation catalysts. This will be particularly apparent from results obtained with the following catalysts.

EXAMPLE 5

A commercially available catalyst was prepared using 100 pounds of a purchased active alumina, manufactured by carefully controlled calcination of beta trihydrate having a surface area of 360 m$^2$/gm and formed into 3 × 8 mesh spheres. The spheres were impregnated with three pounds of nickel nitrate. The nickel nitrate was dissolved in that predetermined quantity of water which would be absorbed by the alumina. The impregnated spheres were allowed to stand about 30 minutes and then dried at 250° F. and calcined at 2,100° F. Then the catalyst precursor was dipped in a solution of palladium chloride, with sufficient palladium chloride to form a catalyst containing 0.035 weight percent palladium. It was then calcined at 700° F. The catalyst was tested as described in Example 1.

Physical Properties

| | |
|---|---|
| Palladium (%) | 0.035 |
| Surface Area (m$^2$/gm) | 25 |
| Pore Volume (cc/gm) | 0.60 |
| Pore Volume Distribution | |
| (Percent based on pore diameter size) | |
| >800 Angstroms | 57 |
| 800 – 350 Angstroms | 17 |
| <350 Angstroms | 26 |
| Average Pore Diameter (Angstroms) | 960 |

Activity

| | |
|---|---|
| Initial Conversion (%) | 85 |
| Activity Retention (%) | 16.5 |
| Polymer Formed (gm/hr × 10$^2$) | 5.09 |
| Catalyst Appearance | Medium Fouling |

EXAMPLE 6

A commercially available catalyst closely resembling the catalyst of Example 5 and similarly prepared and in the form of 1/8 × 3/16 tablets had the following properties.

Physical Properties

| | |
|---|---|
| Palladium (%) | 0.032 |
| Surface Area (m$^2$/gm) | 86 |
| Pore Volume (cc/gm) | 0.30 |
| Pore Volume Distribution | |
| (Percent based on pore diameter size) | |
| >800 Angstroms | 50 |
| 800 – 350 Angstroms | 20 |
| <350 Angstroms | 30 |
| Average Pore Diameter (Angstroms) | 142 |

Activity

| | |
|---|---|
| Initial Conversion (%) | 81.0 |
| Activity Retention (%) | 50.6 |
| Polymer Formed (gm/hr × 10$^2$) | 4.18 |
| Catalyst Appearance | Medium Fouling |

EXAMPLE 7

Alumina was formed into 3 × 8 mesh spheres and calcined at 950° F. to be used as a carrier. In an amount of water required to completely cover a given quantity of these pellets, normally 100 parts by weight of pellets, sufficient palladium chloride was dissolved to form a catalyst coated with 0.035 weight percent palladium. The 100 parts by weight of carrier pellets were then submerged in the palladium chloride solution and allowed to stand 30 minutes. The liquid was drained off and the pellets dried at 250° F. The pellets were then subsequently calcined at 700° F. to form a 0.035 weight percent palladium catalyst. When tested as set forth in Example 1, this catalyst had an initial conversion of 73.0 percent, and only a 28.8 percent activity retention. The catalyst had a surface area of 275; a total pore volume of 0.50; and a pore distribution as follows: > 800 Angstroms, 18%; 800 – 350 Angstroms, 10%; and < 350 Angstroms, 72%.

Examples 5 and 7 illustrate that even well known acetylene hydrogenation catalysts do not perform adequately in isothermal operation. The catalyst which is described in Example 8 performed similarly, as reference to Table 2 will show.

EXAMPLE 8

A catalyst closely resembling the catalyst of Example 7 and similarly prepared was purchased from another source in the form of 1/8 inch × 3/16 inch extrusions. Results of reaction and test conditions given in Example 1 are as follows:

Physical Properties

| | |
|---|---|
| Palladium (%) | 0.025 |
| Surface Area (m²/gm) | 281 |
| Pore Volume (cc/gm) | 0.66 |
| Pore Volume Distribution (Percent based on pore diameter size) | |
| >800 Angstroms | 3 |
| 800 – 350 Angstroms | 4 |
| <350 Angstroms | 93 |
| Average Pore Diameter (Angstroms) | 96 |

Activity

| | |
|---|---|
| Initial Conversion (%) | 80.0 |
| Activity Retention (%) | 23.0 |
| Polymer Formed (gm/hr × 10²) | 5.34 |
| Catalyst Appearance | Badly Fouled |

The unexpected superiority of the catalysts of this invention can best be seen by comparing the activity retention abilities, the quantity of polymer formed, and the ultimate appearance of these catalysts with those of other commercial isothermal selective hydrogenation catalysts. Commercial catalysts are those of Examples 5, 6, 7, and 8. The invention catalysts containing 0.035 percent palladium compared therewith are prepared by following the examples whose numbers are given. The test results given are results of different batches than those previously prepared and tested. Hence these and earlier results are not identical.

TABLE 2

Comparison of Invention with Commercial Hydrogenation Catalysts

| Catalyst | Initial Conversion % | Activity Retention % | Polymer formed (gm/hr×X10²) | Catalyst Appearance |
|---|---|---|---|---|
| Ex. 5 (Com) | 87 | 34 | 5.93 | Medium Fouling |
| Ex. 2 (Inv.) | 81 | 73 | 3.22 | Slightly Fouled |
| Ex. 6 (Com) | 82 | 55 | 4.05 | Medium Fouling |
| Ex. 2 (Inv.) | 86 | 72 | 2.92 | Slightly Fouled |
| Ex. 7 (Com) | 87 | 34 | 5.93 | Badly Fouled |
| Ex. 3 (Inv.) | 88 | 69 | 3.50 | Slightly Fouled |
| Ex. 8 (Com) | 83 | 36 | 5.34 | Medium Fouling |
| Ex. 4 (Inv.) | 87 | 63 | 2.56 | Slightly Fouled |

The foregoing data illustrate an improved performance catalyst which there is no reason to expect would be any better than the other catalysts, particularly that of Example 6 which is a highly commercial catalyst. The catalysts of this invention have been found to surpass all known catalysts in this particular application. Thus known commercial catalysts have activity retention values after 100 hours on stream appreciably less than 60 percent, that is, about 17 to say 50 or 55 percent, whereas the catalysts of this invention have retention values ranging from fifty to 73 percent. It is not to be understood on the basis of these 100 hour tests that the catalysts are effective for only 100 hours. Normally these catalysts in commercial isothermal reactors will have cycle lengths of 1 to 4 months. These catalysts at the end of a cycle are regenerated by steaming in the presence of air at elevated temperatures, thereby restoring the activity to essentially that of new catalysts. However, regeneration procedures are expensive. Therefore it is preferred to minimize the number required by using long life catalysts where possible, such as those of this invention characterized by high activity retention values and low polymer formation.

Isothermal hydrogenation conditions are well known. It is also known that the particular process conditions employed in isothermal operation during selective hydrogenation of acetylenes affect the results. Thus the rates of reaction, polymer formation, etc., are functions of temperature, pressure, and the like. At the higher temperature levels the catalyst has less selectivity, the result being an increase in ethylene hydrogenation. At high temperatures, say those above 400° F., the possibility of olefin degradation or cracking exists. Temperatures therefore are in the range of 80° to 400° F. As pressure is increased the catalyst shows increased activity thus decreasing the quantity of catalyst required by increasing the allowable space velocity. Pressures of atmospheric to 800 psig are used. Varying the hydrogen concentration to give an excess or deficiency of $H_2$ in relation to the stoichiometric quantity has an effect on performance as would be expected. Excess $H_2$ promotes the hydrogenation of olefins rendering a higher temperature which promotes polymer formation. A deficiency of $H_2$ limits hydrogenation and conversely reduces polymer production; however adequate cleanup is normally not achieved if a significant deficiency exists. Choice of the correct space velocity at which a reactor should be operated is important from the economic standpoint during design and form the performance standpoint during operation. Space velocities of 2,000 to 20,000 are employed. Variations in these and other aspects of the invention will occur to those skilled in the art. As an example, any of the various catalyst pellet shapes can be employed. Tablets and extrusions are illustrated, as well as spheres prepared by U.S. Pat. No. 2,889,576. Other methods of preparing these catalysts will also be obvious to those engaged in this field.

What is claimed is:

1. In the process for purifying an olefin gas stream containing acetylene, wherein the acetylene is removed from said olefin stream by selective hydrogenation, the improvement for use when said stream contains 2 to 5 volume percent acetylene, a quantity of acetylene requiring near-isothermal operation, which comprises providing a reaction chamber surrounded with a coolant material adapted to remove at least sixty percent of the heat of reaction, at a temperature of 80° to 400° F. and at a pressure of atmospheric to 800 psig passing the olefin gas stream through a mass of a selective hydrogenation catalyst within said chamber while concomitantly removing said quantity of the heat of reaction, the catalyst being a palladium activated, predominately alumina hydrogenation catalyst of improved selectivity having between 0.01 and 5 percent by weight palladium on a dry basis uniformly distributed throughout a support containing at least seventy percent alumina, any remainder being clay, the support having a surface area of 80 to 300 square meters per gram, with at least 50 percent of its pores having pore diameters in the size range below 350 Angstrom units.

2. The process of claim 1 wherein the stream contains 2 to 3 volume percent acetylene.

3. The process of claim 1 wherein the hydrogenation catalyst has 50 to 98 percent of its pores having pore diameters in the range of 29 to 350 Angstroms, wherein only 1 to about 30 percent of the pores have a pore diameter larger than 800 Angstroms, and wherein its surface area is in the range of 90 through 200 square meters per gram.

4. The process of claim 1 wherein the catalyst contains 30 percent kaolin.

5. The process of claim 1 wherein the catalyst is devoid of clay.

6. The process of claim 1 wherein the catalyst is impregnated with 0.002 to 0.5 percent palladium by weight based on the catalyst.

* * * * *